US008589936B2

(12) United States Patent
Murray et al.

(10) Patent No.: US 8,589,936 B2
(45) Date of Patent: Nov. 19, 2013

(54) METHOD AND APPARATUS FOR MANAGING REALLOCATION OF SYSTEM RESOURCES

(75) Inventors: Christopher W. Murray, Nepean (CA); Gurudas Somadder, San Jose, CA (US); Attaullah Zabihi-Sessian, Kanata (CA)

(73) Assignee: Alcatel Lucent, Paris (FR)

( * ) Notice: Subject to any disclaimer, the term of this patent is extended or adjusted under 35 U.S.C. 154(b) by 474 days.

(21) Appl. No.: 12/724,578

(22) Filed: Mar. 16, 2010

(65) Prior Publication Data
US 2011/0231853 A1   Sep. 22, 2011

(51) Int. Cl.
*G06F 9/46*   (2006.01)
*G06F 15/173*   (2006.01)

(52) U.S. Cl.
USPC ........... 718/104; 718/100; 718/102; 718/105; 709/223; 709/224; 709/226

(58) Field of Classification Search
USPC .................. 718/104, 105; 709/223, 224, 226
See application file for complete search history.

(56) References Cited

U.S. PATENT DOCUMENTS

| 5,890,011 | A | 3/1999 | Abbondanzio |
| 6,333,936 | B1 | 12/2001 | Johansson |
| 6,457,008 | B1* | 9/2002 | Rhee et al. ............................ 1/1 |
| 6,996,647 | B2* | 2/2006 | Raghavan et al. ............ 710/240 |
| 7,284,244 | B1* | 10/2007 | Sankaranarayan et al. ... 718/104 |
| 7,694,082 | B2 | 4/2010 | Golding et al. |
| 7,730,428 | B1 | 6/2010 | Yehuda et al. |
| 7,856,572 | B2 | 12/2010 | Kami et al. |
| 2002/0002609 | A1 | 1/2002 | Chung et al. |
| 2002/0062435 | A1* | 5/2002 | Nemirovsky et al. .............. 712/7 |
| 2003/0236854 | A1* | 12/2003 | Rom et al. ...................... 709/217 |
| 2005/0268302 | A1* | 12/2005 | Geib et al. ...................... 718/100 |
| 2006/0010031 | A1* | 1/2006 | Higuchi et al. .................. 705/10 |
| 2006/0116897 | A1* | 6/2006 | Yoshida et al. .................... 705/1 |
| 2006/0271544 | A1* | 11/2006 | Devarakonda et al. ........... 707/9 |
| 2007/0028068 | A1 | 2/2007 | Golding et al. |
| 2007/0067776 | A1* | 3/2007 | McCarthy et al. ............. 718/104 |

(Continued)

FOREIGN PATENT DOCUMENTS

WO   WO 2009/012296 A2   1/2009
WO   WO 2009/128052 A1   10/2009

OTHER PUBLICATIONS

The International Search Report and The Written Opinion of the International Searching Authority, or the Declaration in PCT/US2011/026802, Alcatel-Lucent USA Inc., Applicant, mailed May 30, 2011, 13 pages.

(Continued)

*Primary Examiner* — Emerson Puente
*Assistant Examiner* — Charles Swift
(74) *Attorney, Agent, or Firm* — Wall & Tong, LLP

(57) ABSTRACT

A capability is provided for reallocating, to a first borrower that is requesting resources, resources presently allocated to a second borrower. A method for allocating a resource of a system includes receiving a request for a system resource allocation from a first borrower, determining a request priority of the first borrower based on a present resource allocation associated with the first borrower, determining a hold priority of a second borrower based on a present resource allocation associated with the second borrower, and determining, using the first borrower request priority and the second borrower hold priority, whether to reallocate any of the second borrower resource allocation to the first borrower.

22 Claims, 7 Drawing Sheets

(56) References Cited

U.S. PATENT DOCUMENTS

| | | | |
|---|---|---|---|
| 2007/0124446 A1* | 5/2007 | Coulthard et al. | 709/223 |
| 2007/0234365 A1* | 10/2007 | Savit | 718/104 |
| 2009/0025004 A1* | 1/2009 | Barnard et al. | 718/104 |
| 2009/0265450 A1* | 10/2009 | Helmer et al. | 709/221 |
| 2010/0011367 A1* | 1/2010 | Sarkar | 718/104 |
| 2010/0043005 A1* | 2/2010 | Ahuja et al. | 718/104 |
| 2010/0088707 A1* | 4/2010 | Corn et al. | 718/104 |
| 2011/0185364 A1* | 7/2011 | Fernandes et al. | 718/104 |

OTHER PUBLICATIONS

Lee B-D et al: "Adaptive middleware supporting scalable performance for high-end network services," Journal of Network and Computer Applications, Academic Press, New York, NY, US, vol. 32, No. 3, May 1, 2009, pp. 510-524.

International Search Report and Written Opinion of the International Searching Authority, or Declaration in PCT/US2011/026827, mailed May 30, 2011, Alcatel-Lucent USA Inc., Applicant.

* cited by examiner

METHOD AND APPARATUS FOR MANAGING REALLOCATION OF SYSTEM RESOURCES

CROSS-REFERENCE TO RELATED APPLICATIONS

This application is related to U.S. patent application Ser. No. 12/724,542, filed Mar. 16, 2010, entitled "METHOD AND APPARATUS FOR HIERARCHICAL MANAGEMENT OF SYSTEM RESOURCES," which is hereby incorporated by reference herein in its entirety.

FIELD OF THE INVENTION

The invention relates generally to system resources of systems such as network management systems and, more specifically but not exclusively, to management of system resources.

BACKGROUND

Network Management Systems (NMSs) are used to manage many different types of communication networks. NMSs typically support many network management functions for use in managing various aspects of communication networks. The network management functions are provided using various hardware and software resources of the NMSs, e.g., processor threads, memory, and the like. As a result, the resources of an NMS are often under serious contention due to competing requests for the resources that are needed to provide the various network management functions. In many cases, the NMS resources themselves must be managed in order to guarantee performance, reliability, predictability, and scalability of the NMS. Inadequate management of the NMS resources often results in NMS platform degradation and, thus, poor experiences for users of the NMS and customers of the communication network managed by the NMS. Furthermore, resource starvation, which may results from inadequate management of the NMS resources, may manifest itself in a variety of ways that are difficult to correlate to the actual problem, such that there is virtually no visibility into the root cause of the resource starvation. While NMS resource management schemes exist today, these approaches merely try to maintain a balance between system throughput and resource consumption without providing a level of control over resource management that would enable guarantees in the performance, reliability, predictability, and scalability of the NMS.

SUMMARY

Various deficiencies in the prior art are addressed by embodiments for managing resources of a system. A capability is provided for reallocating, to a first borrower that is requesting resources, resources presently allocated to a second borrower. In one embodiment, a method for allocating a resource of a system includes receiving a request for a system resource allocation from a first borrower, determining a request priority of the first borrower based on a present resource allocation associated with the first borrower, determining a hold priority of a second borrower based on a present resource allocation associated with the second borrower, and determining, using the first borrower request priority and the second borrower hold priority, whether to reallocate any of the second borrower resource allocation to the first borrower.

BRIEF DESCRIPTION OF THE DRAWINGS

The teachings herein can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE INVENTION

A resource management capability is depicted and described herein. The resource management capability enables management of resources of a system, including allocation and deallocation of system resources, reallocation of system resources, and like resource management functions. The resource management capability provides fine-grain control over resource management, thereby enabling guarantees in the performance, reliability, predictability, and scalability of the system in which the resource management capability is utilized. Although primarily depicted and described herein with respect to use of the resource management capability to manage particular types of resources of a particular type of system (e.g., processor threads, memory, and like resources of a network management system), the resource management capability depicted and described herein may be used to manage any suitable types of resources of any suitable type of system having resources which may be managed.

Figure 1:
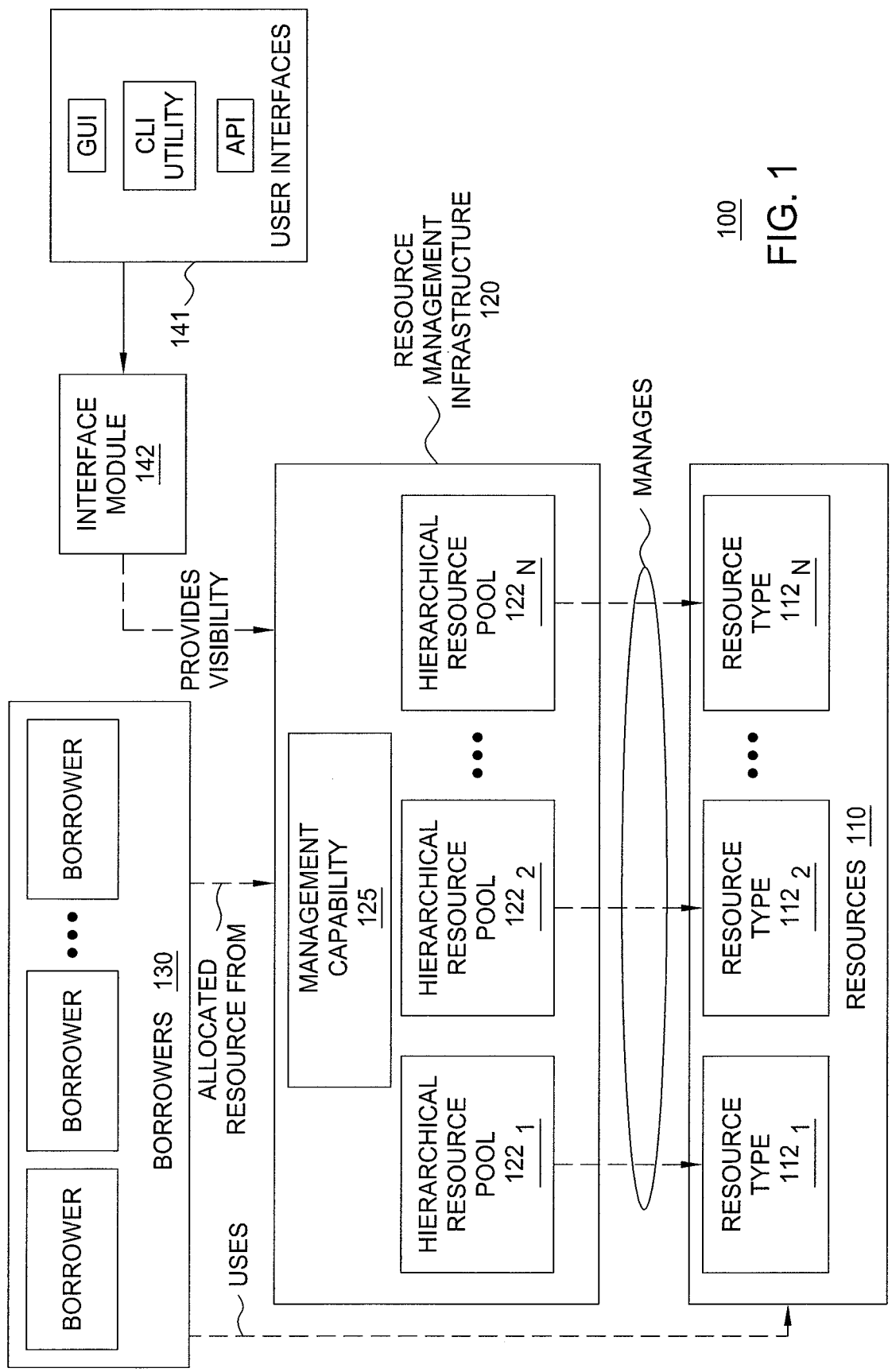
FIG. 1 depicts a high-level block diagram of an exemplary network management system having system resources.

FIG. 1 depicts a high-level block diagram of an exemplary network management system (NMS).

The NMS 100 includes resources 110. The resources 110 may include any resources of an NMS, which may vary for different types of NMSs. The resources 110 include resources of a plurality of resource types $112_1$-$112_N$ (collectively, resource types 112). For example, resources 110 may include resources of resource types 112 such as processor threads, memory, database connections, network connections, and the like. The resource types 112 may be defined in any suitable manner.

The NMS 100 manages resources 110 using a resource management infrastructure (RMI) 120.

The RMI 120 provides hierarchical management of the resources 110. In one embodiment, the RMI 120 provides hierarchical resource management on a per-resource-type basis. In one such embodiment, RMI 120 includes a plurality of hierarchical resource pools (HRPs) $122_1$-$122_N$ (collectively, HRPs 122) for use in managing the resources 110 of the resource types $112_1$-$112_N$, respectively. In this manner, each of the resource types 112 of NMS 100 may be managed independently of each of the other resource types 112 of NMS 100.

In one embodiment, the HRPs 122 each include a master resource pool (MRP) and a plurality of virtual resource pools (VRPs) for use in managing the resources 110 of the associated resource types 112. The HRPs 122 are organized in a hierarchical tree structure for use in performing hierarchical management of the resources 110 of the associated resource types 112. In one embodiment, the MRP forms the root of the hierarchical tree structure, and the VRPs form the remainder of the hierarchical tree structure. The VPRs may be organized within the hierarchical tree structure in any suitable manner (e.g., using any suitable number of hierarchical levels, using any suitable arrangement of the VRPs across the hierarchical level(s), using any suitable parent/child relationships among the MRP and VRPs, and the like, as well as various combinations thereof).

In one embodiment, the MRP for a given HRP 122 is a logical representation of all of the resources 110 of the resource type 112 with which the given HRP 122 is associated, thereby facilitating management of the resources 110 of the resource type 112 with which the given HRP 122 is associated. The MRP for a given HRP 122 may be used to perform any resource management functions associated with managing the resources 110 of the resource type 112 with which the HRP 122 is associated. For example, the MRP for a given HRP 122 may be used to perform resource management functions such as resource lifecycle management (e.g., resource creation and destruction), minimum/maximum management (e.g., enforcing the number of resources 110 of a given resource type 112 in the system), resource lease management (e.g., lease duration and other associated resource lease parameters), borrower priority management, idle timeout management, resource request prioritization management, resource preemption management, and the like, as well as various combinations thereof.

In one embodiment, the VRPs for a given HRP 122 are logical representations of subsets of the resources 110 of the resource type 112 with which the given HRP 122 is associated (and, thus, logical representations of subsets of the resources 110 of the MRP of the given HRP 122), respectively, thereby facilitating management of the respective subsets of resources 110 of the resource type 112 with which the given HRP 122 is associated. The VRPs for a given HRP 122 may be used to perform any resource management functions associated with managing the associated subsets of the resources 110 of the resource type 112 with which the HRP 122 is associated.

In such embodiments, the logical representations of the resources 110 may be implemented (and, thus, managed) using any suitable type of logical representation. In one embodiment, for example, the logical representations of the resources 110 may be implemented using tokens, such as where each of the resources 110 has associated therewith a token that provides the logical representation of the respective resource 110. In such embodiments, the RMI may utilize the tokens as the means for managing the resources 110, respectively. Although primarily described with respect to use of tokens as the logical representations of the resources 110, it will be appreciated that any other suitable means of logically representing, and thus controlling, resources 110 may be utilized.

The VRPs for a given HRP 122 may obtain respective subsets of resources 110 in any suitable manner. The VRPs for a given HRP 122 may obtain the respective subsets of resources (or at least portions of the subsets of resources) from the MRP of the HRP 122 (e.g., as part of an initial allocation of subsets of the resources 110 made from the MRP to the respective VRPs, as part of static and/or dynamic reallocations of the resources 110 from the MRP to the some or all of the VRPs, and the like, as well as various combinations thereof). A given VRP of a given HRP 122 may obtain its associated subset of resources 110 (or at least portions of its associated subset of resources 110) from one or more other VRPs of the given HRP 122 (e.g., using requests to one or more other VRPs which may result in reallocation of unallocated/available resources of the one or more other VRPs to the given VRP, using requests to the MRP which may result in reallocation of allocated resources of the one or more other VRPs to the given VRP, and the like, as well as various combinations thereof).

In this manner, resources 110 of a given HRP 122 may be statically and/or dynamically allocated and/or reallocated across the VRPs in any suitable manner. In such embodiments, the resource allocation and/or reallocation requests initiated by VRPs may flow within HRP 122 in any suitable manner (e.g., with and/or without skipping hierarchical levels of the HRP 122, with and/or without crossing branches of the HRP 122, and the like, as well as various combinations thereof. In at least one such embodiment, resource requests flow in a direction from the leaves of the hierarchical tree structure toward the root of the hierarchical tree structure (i.e., toward the MRP), and resources flow in a direction from the root of the hierarchical tree structure down toward the leaves of the hierarchical tree structure (i.e., toward VRPs).

The VRPs of a given HRP 122 each have one or more borrowing characteristics associated therewith. The borrowing characteristic(s) of the VRPs of a given HRP 122 may be utilized to define the VRPs and organize the arrangement of the VRPs to form the hierarchical tree structure of the given HRP 122. The borrowing characteristics of the VRPs of a given HRP 122 may be utilized to manage the resources 110 of the resource type 112 managed by the given HRP 122 (e.g., for assignment of the respective subsets of resources 110 to the VRPs of the given HRP 122, for preemption of resources 110 between VRPs of the given HRP 122, and the like, as well as combinations thereof). The borrowing characteristics of the VRPs of a given HRP 122 may be used for any other suitable purposes associated with managing the resources 110 of the resource type 112 of the given HRP 122.

The borrowing characteristics of the VRPs of a given HRP 122 may be any characteristics suitable for use in defining and organizing the VRPs of the given HRP 122, managing resources 110 of the resource type 112 managed by the given HRP 122, and the like, as well as various combinations thereof. For example, the borrowing characteristics of the VRPs of the given HRP 122 may be characteristics indicative of the purposes for which the resources 110 of the HRP 122 are to be used, characteristics indicative of the types of borrowers to be using the resources 110 of the HRP 122 (e.g., components, applications, processes, users, and the like), and the like, as well as various combinations thereof.

In this manner, the VRPs of a given HRP 122 may be defined and organized such that the subsets of the resources 110 of the resource type 112 with which the HRP 122 is associated, i.e., the subsets of the resources 110 associated with the respective VRPs, may be used under different conditions.

The definition and organization of the VRPs of a given HRP 122, for purposes of managing the resources 110 of the resource type 112 with which the given HRP 122 is associated, may be better understood by way of the following examples.

In one embodiment, for example, for processor threads managed via an HRP 122, the MRP includes all (or, in some embodiments, a subset) of the processor threads of NMS 100, and a plurality of VRPs may include respective subsets of the processor threads of NMS 100 for use under different conditions as specified by associated borrowing characteristics of the VRPs. For example, first and second subsets of processor threads (i.e., first and second VRPs for processor threads, respectively) may be defined for allocation of processor threads to internal applications running within NMS 100 and for allocation of processor threads for processing requests received from applications external to NMS 100, respectively. It will be appreciated that processor threads may be allocated among VRPs, using any suitable borrowing characteristics, in any other suitable manner.

In one embodiment, for example, for memory managed via an HRP 122, the MRP includes all (or, in some embodiments, a subset) of the memory resources of NMS 100, and a plurality of VRPs may include respective subsets of the memory resources of NMS 100 for use under different conditions as specified by associated borrowing characteristics of the VRPs. For example, first, second, and third subsets of memory (i.e., first, second, and third VRPs for memory resources, respectively) may be defined for allocation of memory to processing of (1) internal processes initiated by NMS 100, (2) system requests received from other systems in communication with NMS 100, and (3) user requests received from users of NMS 100, respectively. In this example, the third subset of memory associated with user requests received from users of NMS 100 may be further subdivided to form two subsets of memory (i.e., a fourth VRP and fifth VRP, respectively) for processing user requests received from (a) users of NMS 100 located at a first Network Operations Center and (b) users of NMS 100 located at a second Network Operations Center, respectively. It will be appreciated that memory may be allocated among VRPs, using any suitable borrowing characteristics, in any other suitable manner.

In one embodiment, for example, for database connections managed via an HRP 122, the MRP includes all (or, in some embodiments, a subset) of the database connections of NMS 100, and a plurality of VRPs may include respective subsets of the database connections of NMS 100 for use under different conditions as specified by associated borrowing characteristics of the VRPs. For example, first and second subsets of database connections (i.e., first and second VRPs for database connections, respectively) may be defined for allocation of database connections to (1) northbound "read" operations (e.g., requests from clients), (2) internal applications within NMS 100 (e.g., processing alarms received at NMS 100, test executions initiated by NMS 100, and the like), respectively. It will be appreciated that database connections may be allocated among VRPs, using any suitable borrowing characteristics, in any other suitable manner.

In one embodiment, for example, for network connections managed via an HRP 122, the MRP includes all (or, in some embodiments, a subset) of the network connections of NMS 100, and a plurality of VRPs may include respective subsets of the network connections of NMS 100 for use under different conditions as specified by associated borrowing characteristics of the VRPs. For example, first and second subsets of network connections (i.e., first and second VRPs for database connections, respectively) may be defined for allocation of network connections to (1) connections to network elements being managed by NMS 100 and (2) connections to user terminals of users using NMS 100 to manage the network elements, respectively. In this example, the first subset of network connections associated with connections to network elements being managed by NMS 100 may be further subdivided to form many subsets of network connections associated with management of multiple subsets of network devices (e.g., based on importance of the network elements, geographical locations of the network elements, and/or any other suitable characteristics on which such subdivisions may be based), and the second subset of network connections associated with connections to user terminals may be further subdivided to form many subsets of network connections associated with multiple subgroups of user terminals (e.g., based on the type of functions performed by the users of the user terminals, geographical locations of the user terminals, and/or any other suitable characteristics on which such subdivisions may be based). It will be appreciated that network connections may be allocated among VRPs, using any suitable borrowing characteristics, in any other suitable manner.

Although the foregoing examples are primarily directed toward embodiments in which all of the resources 110 of a given resource type 112 are managed using a single HRP 122 (and, thus, in which the MRP of the single HRP 122 includes all of the resources 110 of the given resource type 112), in various other embodiments the resources 110 of a given resource type 112 may be managed using multiple HRPs 122 such that each HRP 122 (and, thus, each associated MRP) includes only a subset of the resources 110 of the resource type 112). Similarly, although the foregoing examples are primarily directed toward embodiments in which each of the HRPs 122 manages resources 110 of only a single resource type 112, in various other embodiments, one or more HRPs 122 may manage resources 110 of multiple resource types 112.

As described above with respect to each of the examples provided for the different exemplary resource types, in the HRPs 122 defined in each of the foregoing examples, one or more of the VRPs may be further subdivided, to include any number of subtending VRPs (i.e., any suitable subtree), based on one or more borrowing characteristics specific to the VRP(s) being subdivided, respectively. In this manner, each of the HRPs 122 may be defined using any suitable hierarchical tree structure having any suitable number of VRPs organized using any suitable arrangement based on any suitable borrowing characteristics and/or combinations of borrowing characteristics.

It will be appreciated that the foregoing examples are provided merely for purposes of explaining the manner in which VRPs may be defined for different resource types. It will be appreciated that, for each of these resource types, as well as any other resource types, the VRPs for the resource type may be defined and/or organized in any other suitable manner (e.g., defined based on different characteristics, organized in different hierarchical tree structures, and the like, as well as combinations thereof) and, thus, that the resources of the resource types may be allocated among the VRPs in any other suitable manner.

It will be appreciated that, although primarily depicted and described with respect to a specific number of VRPs arranged in a particular hierarchical tree structure having a particular number of hierarchical levels, an HRP 122 may include any suitable number of VRPs arranged in any suitable hierarchical tree structure having any suitable number of hierarchical levels. It will be appreciated that different HRPs 122 may use the same, similar, or different hierarchical tree structures for managing their resources.

Figure 2:
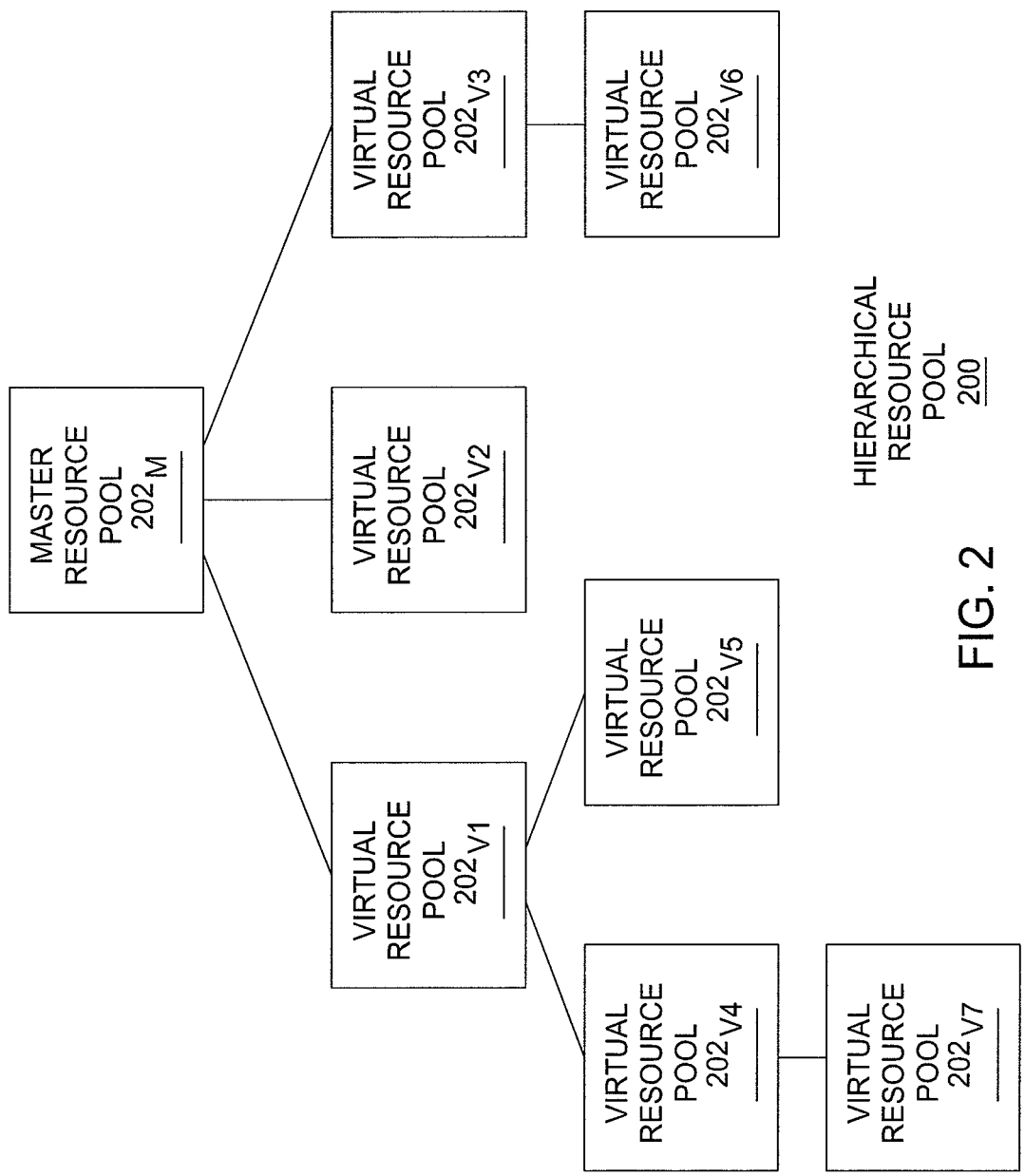
FIG. 2 depicts an exemplary hierarchical resource pool for resources of a resource type of the NMS of FIG. 1.

FIG. 2 depicts an exemplary hierarchical resource pool for resources of a resource type of the NMS of FIG. 1.

As depicted in FIG. 2, the exemplary HRP 200 includes a master resource pool (MRP) 202$_M$ and seven virtual resource pools (VRPs) 202$_{V1}$-202$_{V7}$ (collectively, VRPs 202$_V$), which may be referred to collectively as resource pools (RPs) 202.

The RPs 202 are arranged hierarchically in a tree structure, with the MRP $202_M$ forming the root of the tree structure and the VRPs $202_V$ forming the remainder of the tree structure. As depicted in FIG. 2, VRPs $202_{V1}$, $202_{V2}$, and $202_{V3}$ are children of MRP $202_M$, VRPs $202_{V4}$ and $202_{V5}$ are children of VRP $202_{V1}$, VRP $202_{V6}$ is a child of VRP $202_{V3}$, and VRP $202_{V7}$ is a child of VRP $202_{V4}$.

As described herein, exemplary HRP 200 may be defined for use in managing any suitable resource type 112 of the resources 110 of NMS 100. For purposes of clarity in describing exemplary HRP 122, assume that the exemplary HRP 122 is defined for use in managing database connections of NMS 100 and, further, assume that 1000 database connections are available on NMS 100. In this example, further assume that NMS 100 is accessible by users of multiple Network Operations Centers (NOCs).

In this example, MRP $202_M$ provides a logical grouping of the 1000 database connections of NMS 100, thereby enabling management of the allocation of those 1000 database connections for use by borrowers 130 of NMS 100.

In this example, assume that VRPs $202_{V1}$, $202_{V2}$, and $202_{V3}$ manage database connections for (1) database accesses in response to user requests received from users of NMS 100, (2) database accesses by internal processes initiated by NMS 100, and (3) database accesses by systems in communication with NMS 100, respectively, and, further, that VRPs $202_{V1}$, $202_{V2}$, and $202_{V3}$ are allocated 500, 300, and 200 database connections, respectively.

In this example, assume that VRPs $202_{V4}$ and $202_{V5}$ manage database connections for (1) database accesses in response to user requests received from users of NMS 100 located in a first NOC and (2) database accesses in response to user requests received from users of NMS 100 located in a second NOC, respectively, and, further, that VRPs $202_{V4}$ and $202_{V5}$ are allocated 300 and 200 database connections, respectively. In this example, assume that VRP $202_{V7}$ manages database connections for database accesses in response to user requests received from a subset of the users of NMS 100 located in the first NOC (e.g., supervisors who may need immediate access to resources and, thus, may be served from their own VRP) and, further, that VRP $202_{V7}$ is allocated 100 of the 300 database connections allocated to VRP $202_{V4}$ (i.e., all of the other users at the first NOC must share the 200 database connections not reserved for use by the supervisors).

In this example, assume that VRP $202_{V6}$ manages database connections for database accesses by a particular high priority system, in communication with NMS 100, that may need immediate access to resources (and, thus, may be served from its own VRP) and, further, that VRP $202_{V6}$ is allocated 50 of the 300 database connections allocated to VRP $202_{V4}$ (i.e., all of the other systems in communication with NMS 100 must share the 150 database connections not reserved for use by the high priority system).

It will be appreciated that the HRP 200 of FIG. 2 is merely exemplary, and that HRPs 122 of FIG. 1 may be defined and organized in various other suitable ways.

The use of HRPs 122, such as the exemplary HRP 200 of FIG. 2, in managing resources 110 of a resource type 112 of NMS 100 may be better understood by way of reference back to FIG. 1.

As depicted in FIG. 1, RMI 120 includes a management capability 125. The management capability 125 represents the capability of the RMI 120 to provide management functions for managing the HRPs 122 of RMI 120. The HRPs 122 of RMI 120 may be managed in any suitable manner.

In one embodiment, the HRPs 122 may be managed using one or more managers (e.g., using a single manager for all of the HRPs 122, using multiple managers where one or more of the HRPs 122 share managers, using multiple managers where each of the HRPs 122 has a dedicated manager, and the like, as well as various combinations thereof)

In one embodiment, for example, a single manager manages each of the HRPs 122 of RMI 120. In this embodiment, the single manager is responsible for providing resource management functions for each of the HRPs 122, including each of the MRPs and associated VRPs of each of the HRPs 122. An exemplary embodiment is depicted with respect to FIG. 1 (in which the management capability is the single manager that is responsible for providing resource management functions for each of the HRPs 122).

In one embodiment, for example, each of the HRPs 122 of RMI 120 is managed by its own dedicated manager. In this embodiment, for each of the HRPs 122, the associated manager is responsible for providing resource management functions for the MRP and the associated VRPs of the HRP 122. An exemplary embodiment is depicted with respect to FIG. 3.

Figure 3:
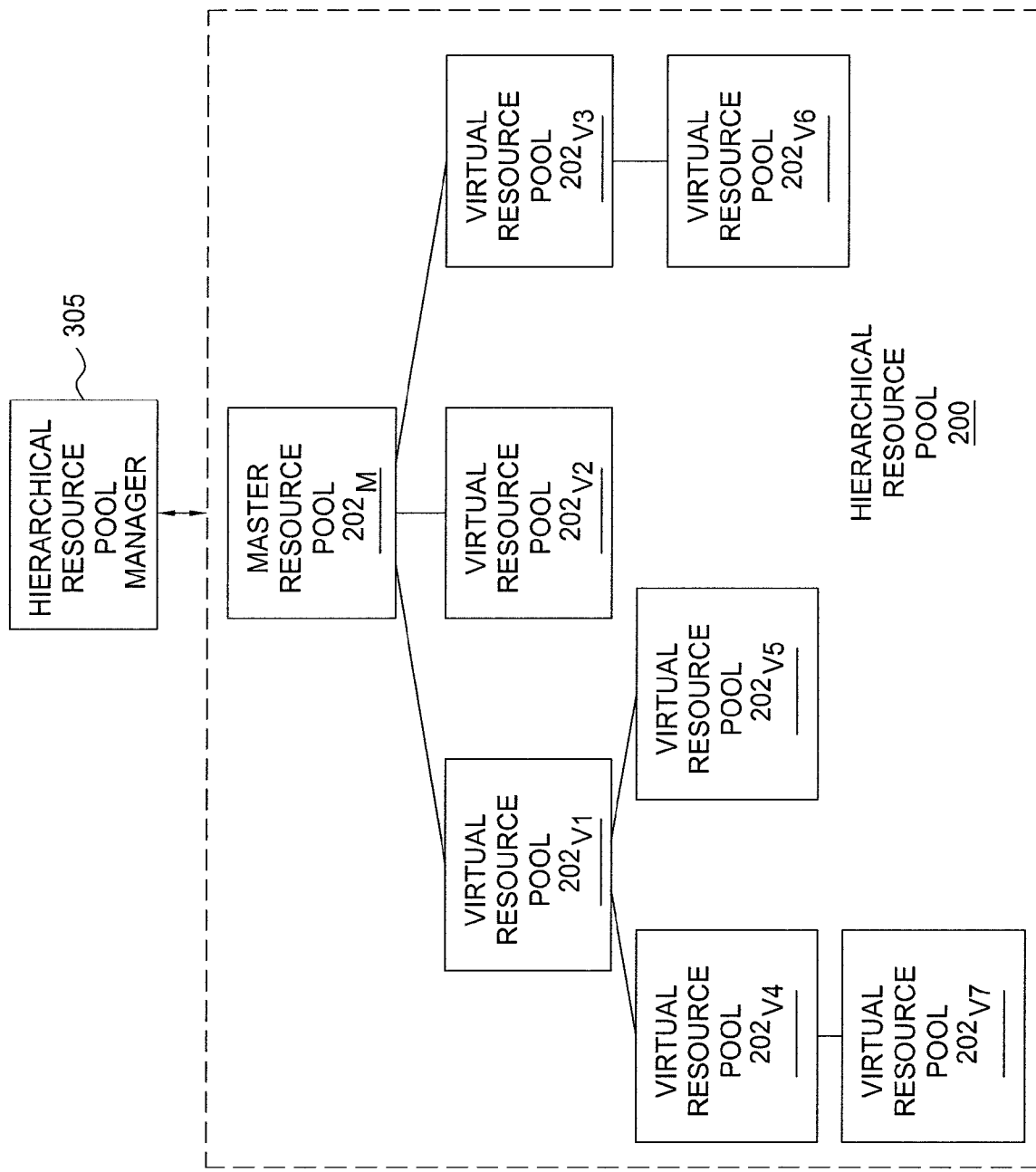
FIG. 3 depicts an exemplary management scheme for managing the exemplary hierarchical resource pool of FIG. 2.

FIG. 3 depicts an exemplary management scheme for managing the exemplary hierarchical resource pool of FIG. 2. As depicted in FIG. 3, the management capability 125 of FIG. 1 is provided using a hierarchical resource pool manager 305. The hierarchical resource pool manager 305 performs management functions for the exemplary HRP 200. In this embodiment, various functions depicted and described herein as being performed by or using the MRP and the associated VRPs of the exemplary HRP 200 are performed by the hierarchical resource pool manager 305. In this sense, described interactions between pools of the exemplary HRP 200 are interactions of the associated instructions and routines of the hierarchical resource pool manager 305 for providing the described functions.

In one embodiment, for example, each of the HRPs 122 of RMI 120 is managed using a set of managers. In one such embodiment, for a given HRP, the set of managers includes an MRP manager providing management functions for the MRP of the HRP 122 and a plurality of VRP managers providing management functions for the respective VRPs of the HRP 122. In such embodiments, the managers of the set of managers interact for providing the associated resource management functions for the HRP 122. An exemplary embodiment is depicted with respect to FIG. 4.

Figure 4:
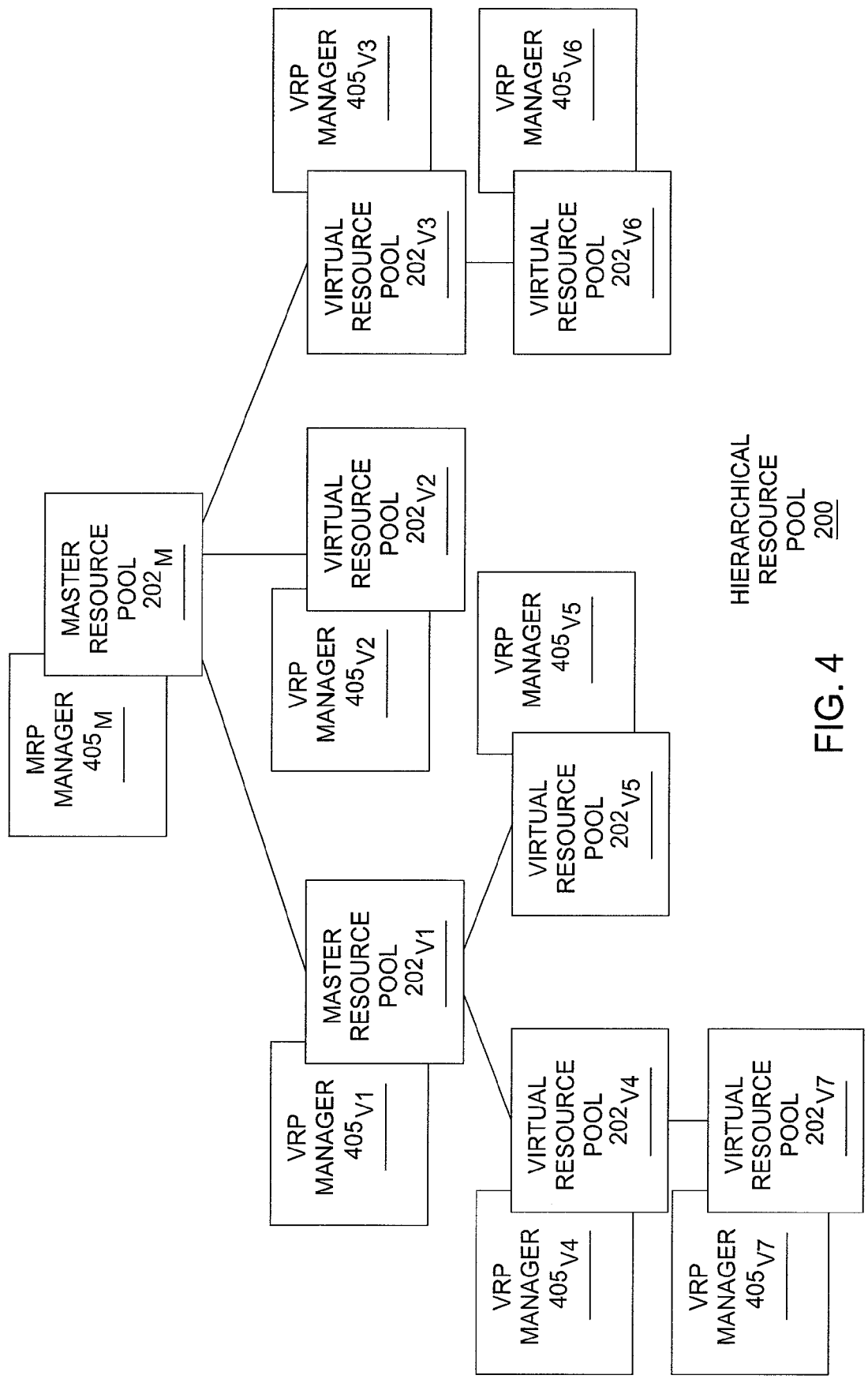
FIG. 4 depicts an exemplary management scheme for managing the exemplary hierarchical resource pool of FIG. 2.

FIG. 4 depicts an exemplary management scheme for managing the exemplary hierarchical resource pool of FIG. 2. As depicted in FIG. 4, the management capability 125 of FIG. 1 is provided using (1) an MRP manager $405_M$ associated with MRP $202_M$ and (2) a plurality of VRP managers $405_{V1}$-$405_{V7}$ associated with the VRPs $202_{V1\text{-}V7}$, respectively. The MRP manager $405_M$ and the VRP managers $405_{V1}$-$405_{V7}$ may be referred to collectively herein as resource pool managers 405. The MRP manager $405_M$ performs management functions for MRP $202_M$. The VRP managers $405_{V1}$-$405_{V7}$ perform management functions for the VRPs $202_{V1\text{-}V7}$, respectively. The resource pool managers 405 cooperate to perform management functions for exemplary HRP 200 as a whole. In this sense, described interactions between pools of the exemplary HRP 200 are interactions of the associated instructions and routines of the respective resource pool managers 405 for providing the described functions.

Although primarily depicted and described as separate embodiments, it will be appreciated that combinations of such embodiments of manager implementations may be utilized within a given NMS.

Although primarily depicted and described with respect to specific embodiments of manager implementations, it will be appreciated that any other suitable embodiments of manager implementations may be used for providing the various resource management functions depicted and described herein.

As depicted in FIG. 1, NMS 100 is used by borrowers 130, which obtain resources 110 via interactions with RMI 120 in order to utilize the resources 110 managed by RMI 120.

The borrowers 130 may include any entities which may request and use resources 110 of NMS 100. The borrowers 130 may include entities within NMS 100 and/or entities remote to NMS 100. For example, borrowers 130 may include components, applications, processes, users, systems, and the like, as well as various combinations thereof.

As described herein, the RMI 120 enables dynamic allocation of the resources 110 of NMS 100 to borrowers 130 of or associated with NMS 100. In one embodiment, RMI 120 receives a resource request from a borrower 130, identifies one of the VRPs associated with the resource request, and attempts to serve the resource request from the identified one of the VRPs. A method according to one embodiment for allocating a resource 110 to a borrower 130 using RMI 120 is depicted and described with respect to FIG. 5.

A borrower 130 may initiate a resource request for one or more resources 110 of a resource type 112.

In one embodiment, three types of resource requests which may be utilized by borrowers 130 to request resources 110 may be used, and may be defined as follows:

(a) the borrower 130 requests a resource 110 and, if the resource 110 is not available at the time of the request, the borrower 130 waits indefinitely until the requested resource becomes available (e.g., via relinquishment of a resource 110 by another borrower 130, via preemption which causes a resource 110 to become available for allocation to the borrower 130, and the like);

(b) the borrower 130 requests a resource 110 and, if the resource 110 is not available at the time of the request, the borrower 130 waits until the requested resource becomes available (e.g., via relinquishment of a resource 110 by another borrower 130, via preemption which causes a resource 110 to become available for allocation to the borrower 130, and the like) or until a specified time has elapsed (i.e., a timeout, where if timeout occurs then the borrower 130 does not acquire the resource 110); and (c) the borrower 130 requests a resource 110 and, if the resource 110 is not available at the time of the request, the borrower 130 does not acquire the resource 110.

It will be appreciated that fewer or more, as well as different, types of resource requests may be supported (e.g., for different management systems, for different types of management systems, for different resource types 112, for different types of borrowers 130, and the like, as well as combinations thereof).

In one embodiment, RMI 120 may manage allocation of resources 110 to borrowers 130 based on one or more priorities associated with each of the borrowers 130.

In one embodiment, each borrower 130 has one or more priorities associated therewith. The priority associated with a borrower 130 may be a priority from a range of available priorities. The range of available priorities supported for the borrowers 130 may be any suitable range of priorities.

For purposes of clarity in describing various features of the resource management capability, the resource management capability is primarily depicted and described with respect to an exemplary embodiment in which the range of priorities is a numerical range from zero (0) through (7), where 0 is the highest priority and 7 is the lowest priority. This is a typical priority range in many networking applications, including network management. Although primarily depicted and described with respect to use of this network priority scale, it will be appreciated that any other suitable ranges of priority values may be used in providing the resource management capability.

In one embodiment, for a given resource type 112, each borrower 130 has two priorities associated therewith: a setup priority and a hold priority, each of which may be a priority value from the range of available priorities available for assignment to the borrowers 130.

In one embodiment, the setup priority of a borrower 130 is used when the borrower 130 is requesting a resource of that resource type 112. The setup priority of the borrower 130 is compared to the setup priorities of other borrowers 130 requesting the same resource type in order to determine the order in which attempts are made to serve the borrowers 130 with resources 110 of that resource type 112.

In one embodiment, the hold priority of a borrower 130 is used during borrower preemption determinations and indicates how "strongly" the borrower 130 holds onto (i.e., retains possession of) the resource(s) 110, of that resource type 112, that is presently allocated to that borrower 130.

In one embodiment, one or more of the priorities of a borrower 130 for a given resource type 112 are assigned based on the present allocation of the resources 110 of the given resource type 112 to the borrower 130. The present resource allocation of a borrower 130 may be measured in any suitable manner. In one embodiment, for example, the present resource allocation of a borrower 130 for a given resource type 112 is measured as the number of resources 110 of the given resource type 112 that are presently allocated to the borrower 130. The present resource allocation of a borrower 130 may be measured in any suitable manner and, thus, for at least some embodiments, references herein to a "number of resources" may be read more generally as being references to "an amount of resources" which may be measured in any suitable manner. As described above, one or both of the setup priority and the hold priority of a borrower 130, for a given resource type 112, may be determined based on the present allocation of resources 110 of the given resource type 112 to the borrower 130). In one embodiment, as the present resource allocation of a borrower 130 changes (e.g., as resources are allocated to and deallocated from the borrower 130), one or more of the associated priorities of the borrower 130 will change. The determination of the priorities of the borrowers 130, based on the present resource allocations of the borrowers 130, enables avoidance of the situation in which certain borrowers 130 monopolize the resources 110.

In one embodiment, in which the priority of a borrower 130 is assigned based on the number of resources 110 of the resource type 112 that are presently allocated to the borrower 130, the number of resources 110 of the resource type 112 that are presently allocated to the borrower 130 falls within a range of allocable resource values. The range of allocable resource values is a range of the number of resources which may be allocated to the borrower 130 (e.g., from a minsize parameter indicative of a minimum number of resources that can be allocated to the borrower 130 to a maxsize parameter indicative of a maximum number of resources that can be allocated to the borrower 130). In one embodiment, a given borrower 130 may have different ranges of allocable resource values associated therewith for different resource types 112. In one embodiment, for a given resource type 112, different borrowers 130 may have different ranges of allocable resource values associated therewith. It will be appreciated that ranges of allocable resource values associated with respective borrowers 130 may be configured in any other suitable manner.

For purposes of clarity in describing various features of the resource management capability, the resource management capability is primarily depicted and described with respect to an exemplary embodiment in which the range of allocable resource values for the borrower 130 is a numerical range from zero (0) through ten (10). It will be appreciated that any other suitable range(s) of the allocable resource values may be used, which may vary across different resource types 112 because the numbers of resources of different resource types may be measured in different ways.

In one embodiment, in which the priority (e.g., setup, hold, and/or the like) of a borrower 130 for a given resource type 112 is adjusted based on the number of resources 110 of that resource type 112 that are presently allocated to the borrower 130, the borrower 130 may have multiple priority levels associated therewith for use in determining the priority of the borrower 130. In one such embodiment, the one of the multiple priority levels used for the borrower 130 at any given time depends on the number of resources 110 of that resource type 112 that are presently allocated to the borrower 130. In such embodiments, the multiple priority levels associated with the borrower 130 may be assigned for the setup priority, the hold priority, or both the setup and hold priorities (i.e., the same set of priority levels may be used for the setup and hold priorities or different sets of priority levels may be used for the setup and hold priorities).

In one such embodiment, in which the priorities of a borrower 130 for a given resource type 112 are adjusted based on the number of resources 110 of that resource type 112 that are presently allocated to the borrower 130, the borrower 130 may have three priority levels associated therewith for the given resource type 112, which may be defined as follows:

(a) base priority (setup and hold): the base priority is used for the borrower 130, for the given resource type 112, when the number of resources presently allocated to the borrower 130 is less than or equal to a minimum size (which may be denoted herein as minsize);

(b) core priority (setup and hold): the core priority is used for the borrower 130, for the given resource type 112, when the number of resources presently allocated to the borrower 130 is less than or equal to a core size (which may be denoted as coresize) but greater than the minimum size (minsize); and (c) burst priority (setup and hold): the burst priority is used for the borrower 130, for the given resource type 112, when the number of resources presently allocated to the borrower 130 is less than or equal to a maximum size (which may be denoted as maxsize) but greater than the core size (coresize).

In one embodiment, in which the priorities of a borrower 130 for a given resource type 112 are adjusted based on the number of resources 110 of that resource type 112 that are presently allocated to the borrower 130, the actual priority that is assigned to the borrower 130 may be determined using a mapping of the range of available priority values supported for the borrower 130 to the priority levels supported for the borrower 130.

The mapping of the of the range of available priority values supported for the borrower 130 to the priority levels supported for the borrower 130 may be implemented in any suitable manner. The mapping may include a mapping of one of the available priority values to one of the priority levels. The mapping may include a mapping of a plurality of the available priorities values to one of the priority levels. The mapping may include one or more interpolations of a range of a subset of the available priority values between two of the priority levels (e.g., adjacent ones of the priority levels). The mapping may include various combinations of such mapping techniques. The mapping of the range of available priority values supported for the borrower 130 to the priority levels supported for the borrower 130 may be better understood by way of reference to the example which follows.

In one embodiment, for example, in which the borrower 130 has three priority levels associated therewith for the given resource type 112 and the range of available priorities for the borrower 130 for the given resource type 112 includes a numerical range from 0 through 7, mapping of the range of available priority values supported for the borrower 130 to the priority levels supported for the borrower 130 may be implemented as follows:

(1) Borrower Parameter Configuration:
  minsize=3
  coresize=6
  maxsize=10
  basepriority=0
  corepriority=3
  burstpriority=7

(2) Borrower Priority Based on Number of Resources:
  Resources 1, 2, 3—Priority=0
  Resources 4, 5, 6—Priority interpolated between priorities 0 (base) and 3 (core) as follows:
    Resource 4—Priority=1
    Resource 5—Priority=2
    Resource 6—Priority=3
  Resources 7, 8, 9, 10—Priority interpolated between priorities 3 (core) and 7 (burst) as follows:
    Resource 7—Priority=4
    Resource 8—Priority=5
    Resource 9—Priority=6
    Resource 10—Priority=7

It will be appreciated that, as the priority levels of the borrower 130 may be defined based on the range of allocable resource values for the borrower 130 (e.g., the base priority level is defined based on the minsize parameter, the core priority level is defined based on the coresize parameter, and the burst priority level is defined based on the maxsize parameter), the mapping of the range of available priority values supported for the borrower 130 to the priority levels supported for the borrower 130 also may be considered to be a mapping of the range of available priority values supported for the borrower 130 to the range of allocable resource values supported for the borrower 130.

It will be appreciated that in embodiments in which the borrower 130 has three priority levels associated therewith for the given resource type 112 and the range of available priorities includes a numerical range from 0 through 7, mapping of the of the range of available priority values supported for the borrower 130 to the priority levels supported for the borrower 130 may be implemented in any other suitable manner. Similarly, it will be appreciated that in embodiments in which the borrower 130 has fewer or more than three priority levels associated therewith for the given resource type 112 and/or the range of available priorities supported for the given resource type 112 includes a different range of priorities, mapping of the of the range of available priority values supported for the borrower 130 to the priority levels supported for the borrower 130 may be implemented in any other suitable manner.

From the foregoing description and the associated example, it will be appreciated that, in at least one embodiment, a borrower priority (e.g., request and/or hold priority) may be determined using a mapping of a range of priority values available for assignment to the borrower to a range of allocable resource values defined by a minimum number of resources allocable to the borrower and a maximum number of resources allocable to the borrower. In one such embodiment, the mapping may include a mapping of a single priority value in the range of priority values available for assignment to the first borrower to a sub-range of the allocable resource values of the range of allocable resource values (e.g., such as mapping of Resources 1, 2, and 3, to Priority 0 in the example above). In one such embodiment, the mapping may include an interpolation of a sub-range of the priority values in the range of priority values available for assignment to the borrower to a sub-range of the allocated resource values in the range of allocable resource values of the borrower (e.g., such as interpolation of Resources 4, 5, and 6 across Priorities 1, 2, and 3 in the example above).

It will be appreciated that prioritization of borrowers 130 may be performed using any other suitable ranges of available priorities, ranges of allocable resource values, mappings of the ranges of available priorities to the ranges of allocable resource values, and the like, as well as various combinations thereof. It will be further appreciated that the ranges of available priorities and/or the ranges of allocable resource values may be measured in any other suitable manner (e.g., using different types of values and the like).

In one embodiment, RMI 120 may manage allocation of resources 110 to borrowers 130 using preemption, where, in response to a resource request for a resource associated with a first VRP, a resource presently allocated to a second VRP is preempted for reallocation to the first VRP such that the resource request may be served. It will be appreciated that this also may include preemption of a borrower 130 presently using a resource of the second VRP where the resource being reallocated to the first VRP from the second VRP is presently allocated to the preempted borrower 130. In this sense, the term "preemption" generally indicates a reallocation to a first entity (e.g., HRP, VRF, borrower) of a resource presently allocated to the second entity (e.g., HRP, VRF, borrower).

In one embodiment, upon a determination that a resource request from a borrower 130 cannot be served by the VRP identified based on the resource request (e.g., the identified VRP does not have any additional resources available for allocation to the borrower 130), a resource reallocation request is initiated for attempting to trigger reallocation of a resource to the identified VRP for use by the identifier VRP in serving the resource request of the borrower 130. The resource reallocation request initiated for the identified VRP may be a request for reallocation of a resource from the associated MRP of the identified VRP, a request for reallocation of a resource from one or more other VRPs of the HRP 122, and the like, as well as various combinations thereof. The resource reallocation request may be triggered in any suitable manner, which may depend on the manner in which the associated HRP 122 is managed. With respect to the arrangement of FIG. 3, for example, the resource reallocation request may be initiated by hierarchical resource pool manager 305 such that the hierarchical resource pool manager 305 causes reallocation of a resource from one or more of the VRPs $202_V$ to the identified VRP 202. With respect to the arrangement of FIG. 4, for example, the resource reallocation request may be initiated by one of the VRP managers $405_V$ to the MRP manager $405_M$ and/or to one or more of the other VRP managers $405_V$ (e.g., directly or via the MRP manager $405_M$).

In one embodiment, when the manager of the MRP receives a resource reallocation request of the manager of the identified VRP, the manager of the MRP determines, based on the resource request from the manager of the identified VRP, whether to preempt a resource from another VRP (e.g., an available resource of another VRP or a resource of another VRP that is presently allocated to another borrower 130) for use by the identified VRP. The manager of the MRP may utilize one or more preemption factors in identifying a candidate VRP(s) from which a resource may be preempted. Similarly, the manager of the MRP and/or the manager of the candidate VRP(s) may utilize one or more preemption factors in identifying a candidate borrower 130 from which the resource will be preempted (in the case in which preemption of a borrower 130 is required).

In one embodiment, when the manager of the candidate VRP receives a resource reallocation request of the manager of the identified VRP, the manager of the candidate VRP attempts to serve the resource reallocation request. In one embodiment, the manager of the candidate VRP first determines whether the candidate VRP has any unallocated resources that may be reallocated to the identified VRP, such that none of the borrowers 130 of the HRP 122 need to be preempted. In one further embodiment, when the manager of the candidate VRP determines that the candidate VRP does not have any unallocated resources available (i.e., all resources of the candidate VRP are presently allocated to borrowers 130), the manager of the candidate VRP determines whether to preempt one of the borrowers 130 of the candidate VRP in order to provide the resource requested by the identified VRP. The manager of the candidate VRP may utilize one or more preemption factors in identifying a candidate borrower 130 from which a resource may be preempted. If the manager of the candidate VRP decides to preempt one of the borrowers 130 of the candidate VRP in order to provide the resource requested by the identified VRP, the manager of the candidate VRP then makes the resource of the preempted borrower 130 available to the identified VRP (e.g., directly or via the manager of the MRP). If the manager of the candidate VRP decides not to preempt any of the borrowers 130 of the candidate VRP in order to provide the resource requested by the target VRP, the manager of the candidate VRP may initiate one or more of the following actions: (a) inform the identified VRP that it cannot provide the resource requested by the identified VRP, (b) propagate the resource reallocation request of the identified VRP to the manager(s) of one or more other VRPs and/or to the MRP (e.g., to the manager of its parent in the HRP 122, to the manager(s) of one or more other branches of the HRP 122, and the like, as well as various combinations thereof), and the like, as well as various combinations thereof.

Although primarily depicted and described herein with respect to embodiments in which the manger of a candidate VRP attempts to service resource reallocation requests received on behalf of identified VRPs, in one embodiment the manager of a candidate VRP may have permission to reject a resource reallocation request. In one such embodiment, the manager of a candidate VRP may be (1) allowed to reject resource reallocation requests that would result in preemption of a resource 110 from a borrower 130, but (2) not allowed to reject resource reallocation requests that would not result in preemption of a resource 110 from a borrower 130 (e.g., such as where the candidate VRP has one or more unallocated resources available). In one such embodiment, the manager of a candidate VRP may be allowed to reject any resource reallocation requests regardless of whether or not the requests would result in preemption of a resource 110 from a borrower 130. In some embodiments, combinations of such embodiments may be used, such as where different VRFs of a given HRP 122 have different rejection permissions associated therewith, where VRFs of different HRPs 122 have different rejection permissions associated therewith, and the like, as well as various combinations thereof.

In this manner, resource reallocation requests may proceed up the hierarchical tree structure of the associated HRP 122 in a direction from the leaves toward the root. In some such embodiments, resource reallocation requests may proceed up the tree by one hierarchical level at a time and/or by multiple hierarchical levels at a time. In such embodiments, the hierarchical tree structure may be traversed in any suitable manner (e.g., a VRP receiving a resource reallocation request from one child VRP may attempt to preempt some or all of its other children VRPs before initiating a resource reallocation requests to the next higher layer of the hierarchical tree structure, a VRP receiving a resource reallocation request from one child VRP may attempt to preempt some or all of its other children VRPs while at the same time initiating a resource reallocation requests to the next higher layer of the hierarchical tree structure until a resource is preempted or the hierarchical tree structure is exhausted, and the like, as well as various combinations thereof).

In this manner, resource reallocation requests may be propagated within the HRP such that resources 110 of the resource type 112 managed using the HRP 122 may be shared among the various VRPs of the HRP 122, thereby enabling controlled, dynamic allocation of resources to borrowers 130.

In one embodiment, the one or more preemption factors, which may be utilized in identifying a candidate VRP (and, in the case of preemption of a borrower 130, identifying a candidate borrower 130 to be preempted) from which a resource 110 may be preempted, include one or more of:

(1) borrower priorities:
  (a) borrower hold priorities: These are the lease hold priorities of the borrowers 130 from which the resource 110 may be preempted. In general, the borrowers 130 having a lower hold priority should be preempted before borrowers 130 having a higher hold priority.
  (b) borrower request priority: This is the priority of the borrower 130 for which the resource 110 may be preempted. This may be compared to the borrower hold priority of the borrower 130 selected as the borrower 130 that, potentially, will be preempted.
(2) resource lease ages: These are the ages of the resource leases presently allocated to the borrowers 130 from which the resource 110 may be preempted. In one embodiment, preemption of short term leases is preferred over preemption of long term leases, as this allows for efficient cache optimization in at least one of the HRPs 122 (e.g., database connections). It will be appreciated that a resource lease having a higher priority will generally tend to have longer-lived resources 110 available to the borrower 130.
(3) graceful preemption: This is implemented so as to prevent the VRP or MRP from forcibly taking a resource 110 from a borrower 130. This may be slightly at odds with the other preemption factors, at least because in order to be responsive to a requesting borrower 130, the first candidate resource that a preempted borrower 130 can safely relinquish can be used, however, the first candidate resource of the preempted borrower 130 may be a very long-lived resource such that any preemption would be in direct conflict with other preemption factors.

It will be appreciated that fewer or more preemption factors, including different preemption factors, may be used in identifying a candidate VRP from which a resource 130 may be preempted.

It will be further appreciated that, as some or all of the preemption factors may be in conflict with each other, the preemption factors may be considered in any suitable manner (e.g., in any suitable order, by applying different weighting or priorities to different ones of the preemption factors, and the like, as well as combinations thereof).

In one embodiment, the use of preemption factors in identifying a candidate VRP from which a resource may be preempted (e.g., which factors are used, the weighting of the factors with respect to each other, and the like) may be different for different resource pools. For example, the use of factors of one HRP 122 may be different than the use of factors of another HRP 122. For example, for a given HRP 122, the use of factors of one VRP may be different than the use of factors of another VRP. Any suitable level of granularity in controlling use of preemption factors in making preemption determinations may be utilized.

In one embodiment, RMI 120 may monitor and maintain resource management statistics associated with operation of RMI 120 in providing the resource management capability. For example, RMI 120 may monitor and maintain statistics such as resource lease times, pending borrowing counts, preemption counts, and the like, as well a combinations thereof. The resource management statistics may be used to enable dynamic tuning of the resource management capability and, thus, the resource management statistics that are monitored and maintained may include any types of statistics suitable for use in enabling automatic tuning of the operation of RMI 120 in providing the resource management capability. The resource management statistics also may be used to provide visibility into the resource management capability by end users, thereby enabling manual tuning of the operation of the RMI 120 in providing the resource management capability. The tuning of the resource management capability may include any suitable modifications, such as redefining the HRPs, redefining and/or reorganizing one or more VRPs of one or more HRPs, redefining the borrower prioritization process (e.g., the range(s) of available priorities for the borrower(s) 130, the range(s) of allocable resource values for the borrower(s) 130, the mapping(s) of the range(s) of available priorities to the range(s) of allocable resource values for the borrowers 130, the basis for determining the priorities of the borrowers 130, and the like, as well as combinations thereof), redefining the borrower preemption process (e.g., the manner in which resource reallocation requests are raised (e.g., by traversing the hierarchical resource tree, directly to the MRP, and so forth), the factors used in determining preemption, the weightings of factors used in determining preemption, and the like, as well as combinations thereof), and the like, as well as combinations thereof. It will be appreciated that, although primarily depicted and described herein with respect to embodiments in which the RMI 120 monitors and maintains resource management statistics associated with management of the resources 110, any other suitable component or components of NMS 100 and/or one or more other systems may monitor and maintain resource management statistics associated with management of the resources 110.

In one embodiment, NMS 100 supports visibility into RMI 120. The visibility into RMI 120 may be provided in any suitable manner. In one such embodiment, visibility into RMI 120 may be provided via one or more types of user interfaces 141 which access RMI 120 via one or more interface modules 142. The types of user interfaces 141 include any types of user interfaces adapted for use in accessing and interacting with RMI 120. For example, user interfaces 141 may include one or more of a graphical user interface (e.g., via user workstations of users of NMS 100, via a web console, and the like), a command line interface (CLI) utility, an Application Programmer Interface (API), and the like, as well as combinations thereof. The interface module 142 include any interface modules adapted for use in supporting interfacing between the user interfaces 141 and RMI 120. For example, the interface module 142 may include Java Management Extensions (JMX), Simple Network Management Protocol (SNMP), and the like, as well as combinations thereof. The visibility into RMI 120 provided via user interfaces 141 and interface module 142 may be utilized to perform various functions, such as review resource management statistics, configure and reconfigure various aspects of the resource management capability, and the like, as well as combinations thereof. It will be appreciated that, although primarily depicted and described with respect to embodiments in which visibility is provided into RMI 120, visibility may be provided into other elements of NMS 100 related to the resource management capability provided by RMI 120 for purpose of reviewing and/or managing the resource management capability provided by RMI 120.

It will be appreciated that, although primarily depicted and described herein as including specific elements (i.e., those specific to operation of the resource management capability), NMS 100 may include any other elements which may be implemented within an NMS. For example, the NMS 100 may include processors, memory, databases (e.g., one or more Management Information Bases (MIBs)), internal communications buses, input/output modules (e.g., for network communications, for communications with user workstations of users using NMS 100, and the like, as well as combinations thereof). In one embodiment, for example, NMS 100 may be implemented using as computer 700 depicted and described with respect to FIG. 7. In this manner, the resource management capability is not intended to be limited to an NMS having any particular design but, rather, may be utilized in any NMS having resources which may be managed using the resource management capability.

It will be appreciated that, although primarily depicted and described herein as being a centralized NMS, the NMS 100 may be implemented in a distributed manner. For example, as described herein, the borrowers 130 depicted as forming part of NMS 100 may include entities that are remote from the NMS for which the resource management capability is provided. Thus, the communication between at least a portion of the borrowers 130 and the NMS 100 may be via any suitable communication paths (which may include one or more communication networks), such as where users located in NOCs geographically remote from the NMS 100 may access the NMS 100 and, thus, may utilized resources of the NMS 100 for performing various functions. Similarly, for example, as described herein, access to the NMS 100 via user interfaces 141 may be performed remotely via any suitable communication paths (which may include one or more communication networks), such as where users geographically remote from the NMS 100 may access the NMS 100. Similarly, for example, it will be appreciated that other portions of the NMS 100 also may be implemented in a physically distributed fashion. As such, it will be appreciated that various components depicted and described as forming part of the NMS 100 may be implemented using any suitable centralized and/or distributed design.

Figure 5:
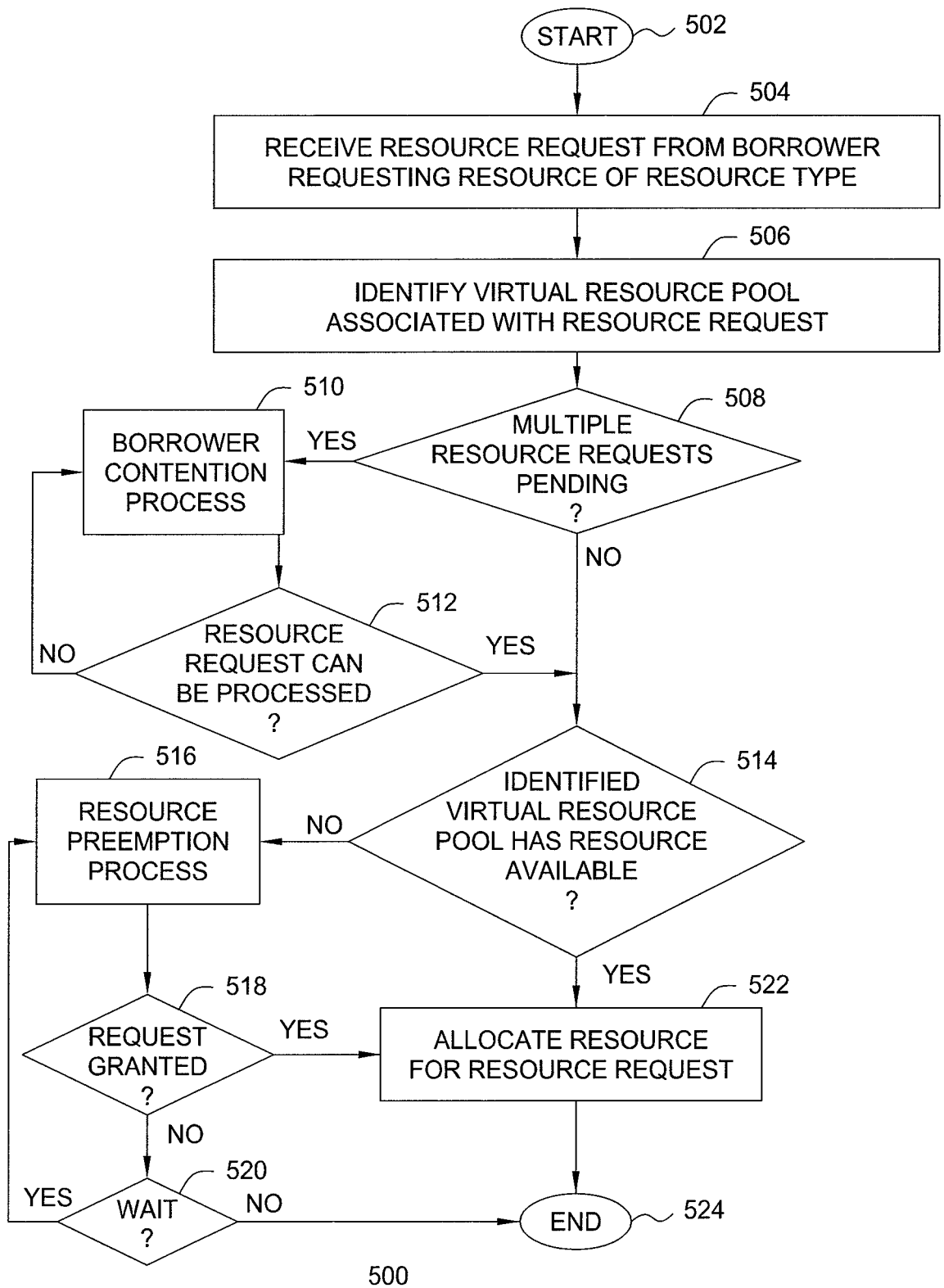
FIG. 5 depicts one embodiment of a method for processing a resource request from a borrower requesting a resource of a system.

FIG. 5 depicts one embodiment of a method for processing a resource request from a borrower requesting a resource of a system.

At step 502, method 500 begins.

At step 504, a resource request is received. The resource request is received from a borrower. The resource request may be an explicit resource request (e.g., the request itself explicitly indicates a request for resources, which may or may not include an explicit indication of the type and/or quantity of resources being requested) or an implicit resource request (e.g., the request itself does not explicitly indicate a request for resources, but a determination may be made, based upon the request, that resources may be or will be required in order to serve the request). In the case of an explicit request that does not indication of the type, the type and quantity of the resources being requested may be determined using one or more characteristics associated with the resource request. In the case of an implicit request, one or more characteristics of the request may be used to identify the request as being a request for which resource may be or will be required, as well as to identify the type and quantity of resources being requested. The characteristics of the request may include any characteristics suitable for use in identifying the request as being a request for which resource may be or will be required and/or identifying the type and quantity of resources being requested (e.g., a source of the request, a type of the request, at least one parameter of the request, and the like, as well as various combinations thereof).

At step 506, a VRP associated with the resource request is identified. The VRP associated with the resource request may be identified in any suitable manner.

In one embodiment, the VRP associated with the resource request is explicitly identified within the resource request, such that the VRP associated with the request may be identified directly from the resource request. It will be appreciated that explicit specification of the associated VRP within the resource request may be provided in any suitable manner (e.g., using a unique VRP identifier where such identifiers are unique across HRPs, using a resource type/HRP identifier and a VRP identifier where the VRP identifiers are unique only within their respective resource types/HRPs, and the like, as well as combinations thereof). The one of the VRPs of the resource type of the resource request may or may not be explicitly specified within the resource request.

In one embodiment, the VRP associated with the resource request is not explicitly identified within the resource request, such that the associated VRP is identified using processing of information associated with the resource request and information associated with the HRP with which the resource request is associated.

In one embodiment, in which the resource type of the resource requested in the resource request is not explicitly specified within the resource request, determination of the one of the VRPs of the resource type of the resource request may include a step of determining the resource type of the resource requested in the resource request. The resource type of the resource requested in the resource request may or may not be explicitly specified within the resource request. If the resource type is explicitly specified in the resource request, the resource type is determined directly. If the resource type is not directly specified within the resource request, the resource type is determined from one or more characteristics associated with the resource request. The characteristics of the resource request which may be used for determining the resource type of the resource may include any characteristics suitable for use in determining the resource type of the resource requested in the resource request (e.g., a source of the request, a request type of the request, at least one parameter of the request, and the like, as well as combinations thereof). In such embodiments, determination of the resource type may be used to identify the HRP that is used to manage the type of resource requested in the resource request, such that one or more additional characteristics associated with the resource request may then be used to determine the one of the VRPs of the resource type of the resource request.

In one embodiment, the VRP associated with the resource request is identified using one or more characteristics associated with the resource request. In one such embodiment, the VRP associated with the resource request is identified by (1) determining one or more characteristics associated with the resource request and (2) comparing the one or more characteristics associated with the resource request to HRP definition information associated with HRP, where the HRP definition information includes information suitable for use in correlating the resource request to the VRP associated with, the resource request based on the one or more characteristics of the resource request. In one such embodiment, the HRP definition information includes, for each of the VRPs of the HRP, one or more characteristics associated with the VRP which defines thereby the resource requests intended to be served by the VRP. In this embodiment, the VRP associated with the resource request is identified by (1) determining one or more characteristics associated with the resource request and (2) comparing the one or more characteristics of the resource request to the one or more characteristics of each of at least a portion of the VRPs until the VRP having characteristics that most closely match the characteristics of the resource request is identified. Thus, the characteristic(s) of the resource request may include any characteristic(s) suitable for use in identifying which of the VRPs of the HRP is most closely associated with the resource request, which may depend on the manner in which the associated HRP is defined (i.e., the characteristics used to define the hierarchical structure of the HRP with which the resource request is associated). For example, characteristics suitable for use in determining the VRP associated with the resource request may include one or more of a source of the request, a type of request of the resource type, and the like, as well as combinations thereof.

It will be appreciated, at least from the foregoing embodiments and associated examples, that any characteristic or characteristics that are included within, determined from, or otherwise associated with the resource request, may be used to identify the VRP being used to manage allocation of resources for the type of resource of the resource request received from the borrower.

At step 508, a determination is made as to whether multiple resource requests are pending. The multiple resource requests may be from one or more borrowers having different priorities associated therewith, such that the order in which the resource requests are served may be dynamically changing in response to one or more factors (e.g., as resource requests are received and added to the pending resource request list, as resources are allocated and the associated requests are removed from the pending resource requests list, as resources are allocated to and de-allocated from borrowers such that the priorities of the borrowers change based on the present numbers of resources allocated to the borrowers, and the like, as well as combinations thereof). If multiple resource requests are not pending, method 500 proceeds to step 514. If multiple resource requests are pending, method 500 proceeds to step 510.

At step 510, a borrower contention process is performed. The borrower contention process is a process for managing the order in which resource requests of borrowers are served, where the order may change over time based on one or more factors (as described above with respect to step 508). From step 510, method 500 proceeds to step 512. At step 512, a determination is made as to whether the resource request of the borrower of method 500 (i.e., the borrower associated with the resource request received at step 504) can be processed, which is based on the current status of the borrower contention process of step 510. If a determination is made that the resource request of the borrower cannot be processed, method 500 returns to step 510 (i.e., the borrower contention process of step 510 continues to be performed until a determination is made, as indicated by step 512, that the resource request of the borrower of method 500 can be processed). If a determination is made that the resource request of the borrower can be processed, method 500 proceeds to step 514 (i.e., the resource request of the borrower of the method 500 has reached the front of the resource request queue such that it may then be processed). In this manner, as the order in which resource requests of borrowers are served changes, the borrower contention process of step 510 continues to be performed until the resource request of the borrower of method 500 can be processed (i.e., the borrower of method 500 may need to wait some period of time before an attempt is made to service the resource request of the borrower, which is indicated by a determination at step 512 that the resource request of the borrower of method 500 can be processed and, thus, that method 500 may proceed to step 514).

At step 514, a determination is made as to whether the identified VRP has resources available for serving the resource request (i.e., for allocating to the borrower the resource requested by the borrower in the resource request). If the identified VRP has resources available such that it may serve the resource request of the borrower, method 500 proceeds to step 522. If the identified VRP does not have resources available such that it may not serve the resource request of the borrower, method 500 proceeds to step 516.

At step 516, a resource preemption process is performed. The resource preemption process is a process for determining whether or not to preempt a resource (e.g., preempt a VRP and, optionally, preempt a borrower of that VRP) so as to reallocate the preempted resource for use by the identified VRP for serving the resource request of the borrower. The resource preemption process may be better understood by way of reference to the description of preemption provided with respect to FIG. 1.

At step 518, a determination is made as to whether the preemption request has been granted (i.e., as to whether the resource required by the identified VRP has been preempted and reallocated to the identified VRP for use in serving the resource request of the borrower. If a determination is made that the preemption request is not granted, method 500 proceeds to step 520. If a determination is made that the preemption request is granted, method 500 proceeds to step 522.

At step 520, a determination is made as to whether the borrower waits for allocation of resources. The determination as to whether the borrower waits for allocation of resources may be based on any suitable factors. For example, the determination as to whether the borrower waits for allocation of resources may be based on the configuration of the borrower, where at least some borrowers may be configured to operate in one of three modes (e.g., as described with respect to FIG. 1). For example, determination as to whether the borrower waits for allocation of resources may be based on a length of time that the borrower is able or willing to wait for the resource (e.g., such as where a borrower is willing to wait for a set amount of time, after which the resource request of the borrower times out, as described with respect to the borrowers of FIG. 1). The determination as to whether the borrower waits for allocation of resources may be based on combinations of such factors, as well as any other suitable factors. If the borrower does not wait for allocation of resources, method 500 proceeds to step 524, at which point method 500 ends (without allocation of the requested resource to the borrower). If the borrower waits for allocation of resources, method 500 returns to step 516 (at which point the borrower preemption process continues to run or is re-initiated) and then step 518.

At step 522, a resource is allocated to the borrower in response to the resource request. The resource is allocated from the identified VRP. As indicated from steps 514-520, the allocated resource may be a resource available from the identified VRP when the resource request from the borrower is received or a resource provided to the identified VRP through resource preemption. From step 522, method 500 proceeds to step 524.

At step 524, method 500 ends.

Although omitted from method 500 FIG. 5 for purposes of clarity, in one embodiment, in which a resource of the identified VRP becomes available while the resource preemption process is being performed, method 500 may automatically proceed to step 522 (e.g., from step 516, 518, or 520) such that the newly available resource of the identified VRP may be provided to the borrower. In one such embodiment, the resource preemption process may be terminated (and it will be appreciated that graceful termination is preferable). In another such embodiment, the resource preemption process may continue to be performed so as to make one or more additional resources available to the identified VRP (as the identified VRP is likely to still be overloaded at this point).

It will be appreciated that, although primarily depicted and described herein with respect to embodiments in which resource management is provided on a per-resource-type basis (i.e., where a HRP 122 is formed for each resource type 112 for managing the resources 110 of the resource type 112), different granularities of resource management may be supported.

In one embodiment, for example, all of the resources of the system to be managed (including resources of multiple resource types) may form one overall HRP for the system to be managed. In one such embodiment, the resource to be managed by the HRP may be organized such that the first level of the HRP below the MRP (i.e., the first hierarchical layer of VRPs closest to eh MRP) includes a plurality of VRPs for managing resources associated with a plurality of resource types, respectively.

In one embodiment, for example, resources of one or more resource types may be managed separately using multiple HRPs for each of the one or more resource types. In such embodiments, the HRPs will not manage all of the resources of particular resource types; rather, the HRPs will manage respective subsets of the resources of particular resource types.

It will be appreciated that other granularities of resource management may be supported.

Although primarily depicted and described herein with respect to embodiments in which RMI 120 indirectly manages the resources of NMS 100 (e.g., such as where the resources 110 are managed by the RMI 120 using tokens or other suitable representations of the resources 110), in at least one other embodiment the RMI 120 may directly manage some or all of the resources of NMS 100. In such embodiments, one or more HRPs 122 of the RMI 120 may have direct management control over the respective resources 110 with which the HRP(s) 122 are associated. In such embodiments, rather than HRPs 122 managing resources 110 via control of tokens or other suitable representations of the resources 110, one or more of the HRP(s) 122 may manage the respective resources 110 directly (e.g., directly allocating and deallocating the resources 110).

Although primarily depicted and described herein with respect to embodiments in which resources 110 of NMS 100 are managed using one or more HRPs 122 with each of the one or more HRPs 122 having an MRP and a plurality of VRPs, it will be appreciated that various embodiments of the resource management capability depicted and described herein may be provided within the context of more general resource management schemes. In one embodiment, for example, at least a portion of the functions depicted and described herein as being provided using one or more HRPs 122 may be provided using a hierarchical arrangement of resource pools that are not necessarily arranged as an MRP and associated plurality of VRPs. In one embodiment, for example, at least a portion of the functions depicted and described herein as being provided using one or more HRPs 122 may be provided using a plurality of resource pools that are not necessarily arranged hierarchically. For example, such embodiments may be used in conjunction with various capabilities depicted and described herein, such as borrower prioritization functions, borrower preemption functions, and the like, as well as various combinations thereof. One such embodiment which may be used both within the context of the hierarchical resource management capability depicted and described herein and within the context of other types of resource management schemes is depicted and described with respect to FIG. 6.

Figure 6:
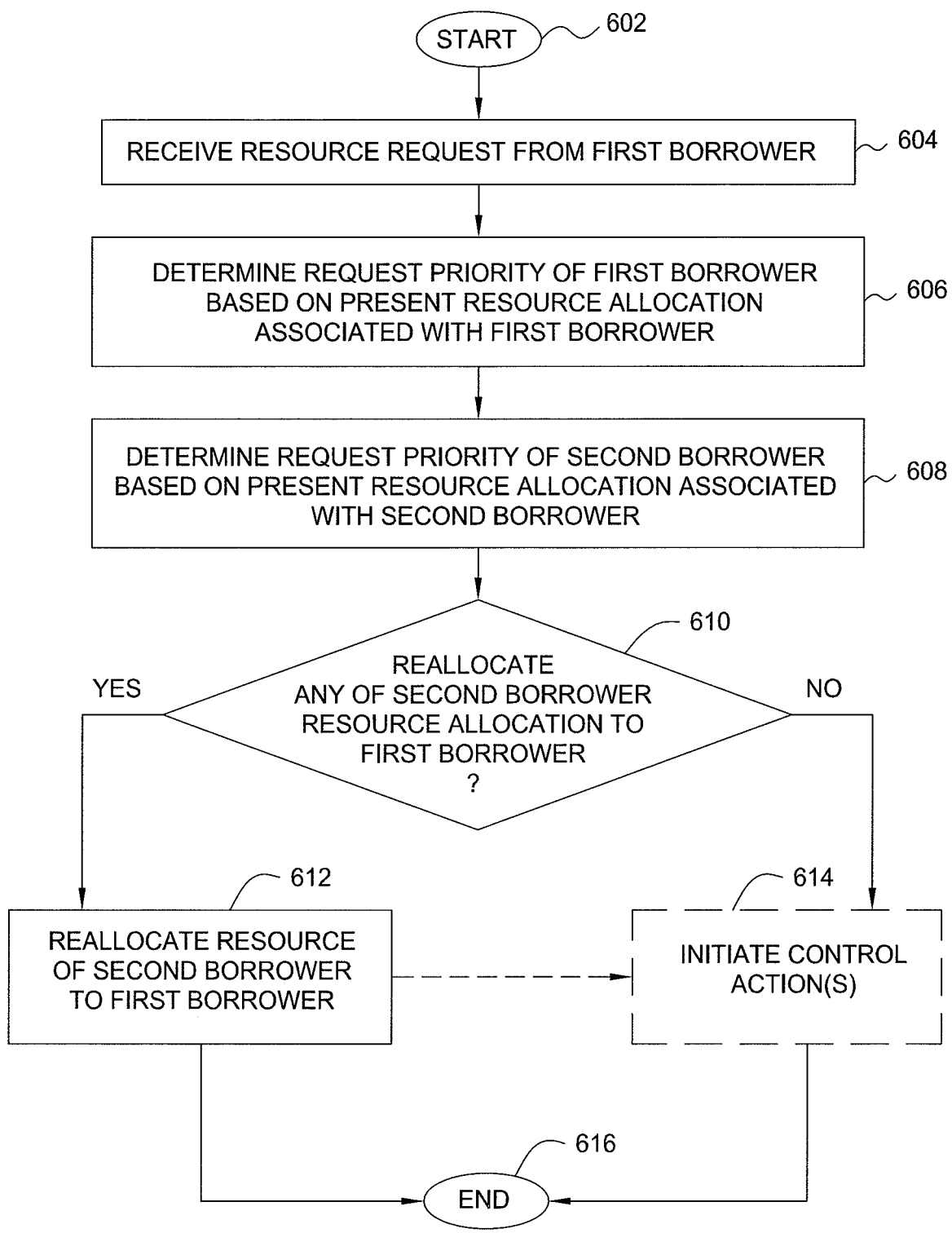
FIG. 6 depicts one embodiment of a method for determining whether to reallocate resources between borrowers.

FIG. 6 depicts one embodiment of a method for determining whether to reallocate resources between borrowers. More specifically, the method 600 of FIG. 6 provides a method for determining whether or not to reallocate to a first borrower a resource currently allocated to a second borrower.

At step 602, method 600 begins.

At step 604, a resource request is received. The resource request is received from the first borrower.

At step 606, a request priority of the first borrower is determined based on a present resource allocation associated with the first borrower. The first borrower request priority may be determined in any suitable manner, including as described herein with respect to FIG. 1-FIG. 5.

At step 608, a request priority of a second borrower is determined based on a present resource allocation associated with the second borrower. The second borrower, which is identified as a candidate borrower from which resources may be reallocated, may be identified in any suitable manner (e.g., a borrower of the system having a lowest hold priority among the borrowers of the system, a borrower of a resource pool having a lowest hold priority among the borrowers of the resource pool, randomly, and the like). The second borrower request priority may be determined in any suitable manner, including as described herein with respect to FIG. 1-FIG. 5.

At step 610, a determination is made as to whether to reallocate any of the second borrower resource allocation of the second borrower to the first borrower. The determination as to whether to reallocate any of the second borrower resource allocation to the first borrower is made using at least the first borrower request priority and the second borrower hold priority. The determination as to whether to reallocate any of the second borrower resource allocation to the first borrower may be made using any other suitable factors (e.g., lease time, graceful preemption considerations, and the like, as well as various combinations thereof). If a determination is made to reallocate resources from the second borrower to the first borrower, method 600 proceeds to step 612. If a determination is made to reallocate resources from the second borrower to the first borrower, method 600 proceeds to step 614.

At step 612, resources of the second borrower are reallocated to the first borrower. The resources of the second borrower may be reallocated to the first borrower in any suitable manner. From step 612, method 600 may proceed to step 614 (at which point one or more control actions may be performed) or to step 616 (at which point method 600 ends).

At step 614 (an optional step), one or more control actions may be performed.

If method 600 proceeds from step 612 to step 614, the control action(s) may include any control actions that may be appropriate following reallocation of the resource of the second borrower to the first borrower (e.g., modification of the first borrower request priority and/or the second borrower hold priority based on the change(s) in the present resource allocation(s) of the first borrower and/or second borrower from the resource reallocation). If method 600 proceeds to step 614, method 600 then proceeds to step 616.

If method 600 proceeds from step 610 to step 614, the control action(s) may include any control actions that may be appropriate following a determination not to reallocate resources of the second borrower to the first borrower. For example, a control action may include initiating a resource reallocation request for identifying another potential source(s) of resources (e.g., another borrower of the same resource pool, one or more borrowers of a different resource pool, borrowers of multiple resource pools, and the like, as well as various combinations thereof) which may be reallocated to the first borrower, For example, a control action may include waiting a period of time and reevaluating the second borrower and/or any other potential borrower based on possible changes in the priorities of the borrowers as the resource allocations of the borrowers change over time. It will be appreciated that any other suitable control actions may be initiated, as well as various combinations of such control actions.

At step 616, method 600 ends.

Although primarily depicted and described herein with respect to embodiments in which priorities are assigned at the borrower level, in at least some embodiments, priorities may be assigned at a lower level (e.g., such as at a resource lease level for groups of resources associated with respective leases by which the resources were allocated, a resource level such that different resources allocated to a borrower may be treated differently, and the like, as well as various combinations thereof). In such embodiments, determinations as to whether or not to reallocate, to a first borrower, resources from a second borrower may include determinations as to which of the particular resources of the second borrower to reallocate to the first borrower (e.g., based on the priorities of the leases through which the second borrower has been allocated respective groups of resources, based on the priorities of the resources currently allocated to the second borrower, and the like, as well as various combinations thereof).

Although primarily depicted and described with respect to use of the resource management capability to perform resource management for a system, a configuration capability may be provided for configuring a system to provide the resource management capability. For example, a configuration capability may be provided for provisioning NMS 100 to provide RMI 120 as described herein. The capability may be supported by NMS 100, and/or by one or more other systems which may (1) determine the provisioning of NMS 100 to provide RMI 120 and (2) communicate, to NMS 100, the determined provisioning of NMS 100 to provide RMI 120. As described herein, the resource management capability may be provided for any suitable type of system, and, thus, in one embodiment, a method includes steps of (a) identifying a resource type supported by the system, (b) generating hierarchical resource configuration information for the system, which includes generating, for the resource type, an HRP including a MRP and a plurality of VRPs (where the VRPs may be defined using any suitable characteristics and organized in any suitable arrangement), and (c) storing the hierarchical resource configuration information. In one embodiment, these steps may be performed for each of a plurality of resource types supported by the system such that the resources of the resource types may be managed separately. In such embodiments, any of the hierarchical resource configuration information (e.g., definitions and arrangements of resource pools, parameters associated with hierarchical resource management (e.g., associated with borrowers, resource pools, and so forth), and the like) may be configured in any suitable manner. Similarly, in such embodiments, any of the hierarchical resource configuration information may be reconfigured in any suitable manner and in response to any suitable trigger condition.

Figure 7:
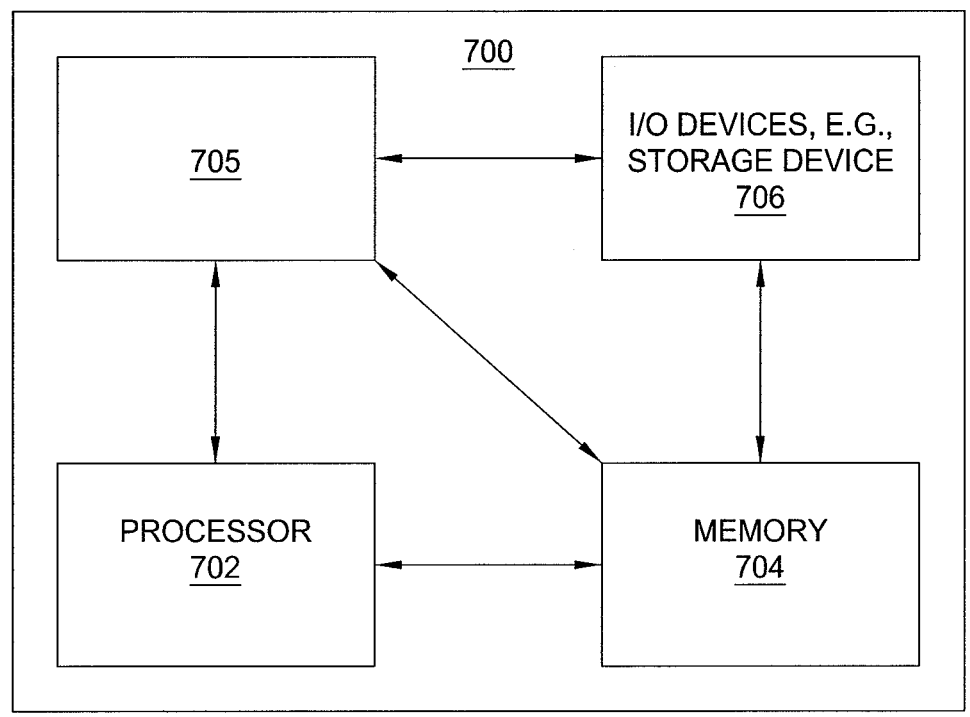
FIG. 7 depicts a high-level block diagram of a computer suitable for use in performing the functions described herein.

FIG. 7 depicts a high-level block diagram of a computer suitable for use in performing the functions described herein. As depicted in FIG. 7, computer 700 includes a processor element 702 (e.g., a central processing unit (CPU) and/or other suitable processor(s)), a memory 704 (e.g., random access memory (RAM), read only memory (ROM), and the like), a resource management module/process 705, and various input/output devices 706 (e.g., a user input device (such as a keyboard, a keypad, a mouse, and the like), a user output device (such as a display, a speaker, and the like), an input port, an output port, a receiver, a transmitter, and storage devices (e.g., a tape drive, a floppy drive, a hard disk drive, a compact disk drive, and the like)).

It will be appreciated that the functions depicted and described herein may be implemented in software, hardware, and/or a combination of software and hardware, e.g., using a general purpose computer, one or more application specific integrated circuits (ASIC), and/or any other equivalents. In one embodiment, resource management process 705 can be loaded into memory 704 and executed by processor 702 to implement the functions as discussed hereinabove. As such, resource management process 705 (including associated data structures) can be stored on a computer readable storage medium, e.g., RAM memory, magnetic or optical drive or diskette, and the like.

Although primarily depicted and described herein with respect to embodiments in which the resource management capability is utilized for managing resources of a single computer, in other embodiments the resource management capability may be used for managing resources across multiple computers. In at least some such embodiments, a single HRP may span multiple computers, where different VRPs of the HRP exist on different computers. Similarly, in at least some such embodiments, a single VRP may exist on different computers. In such embodiments, the multiple computers may communicate using any suitable means of communications. For example, the computers may communicate via one or more system buses, via one or more communication networks (e.g., a Local Area Network (LAN), a Wide Area Network (WAN), and/or any other suitable communications networks using any suitable communications technologies, protocols, and the like). In this manner, the resource management capability enables distributed resource management (e.g., for single systems implemented in a physically distributed manner, for multiple systems where management of resources may be performed for the multiple systems as a whole, and the like, as well as various combinations thereof).

It is contemplated that some of the steps discussed herein as software methods may be implemented within hardware, for example, as circuitry that cooperates with the processor to perform various method steps. Portions of the functions/elements described herein may be implemented as a computer program product wherein computer instructions, when processed by a computer, adapt the operation of the computer such that the methods and/or techniques described herein are invoked or otherwise provided. Instructions for invoking the inventive methods may be stored in fixed or removable media, transmitted via a data stream in a broadcast or other signal bearing medium, and/or stored within a memory within a computing device operating according to the instructions.

Although various embodiments which incorporate the teachings of the present invention have been shown and described in detail herein, those skilled in the art can readily devise many other varied embodiments that still incorporate these teachings.

What is claimed is:

1. A method for allocating a resource of a management system, comprising:
   receiving, from a first borrower, a request for a system resource allocation;
   determining a request priority of the first borrower based on a present resource allocation associated with the first borrower, wherein the first borrower request priority is determined using at least one of:
      a first mapping of a range of priority values available for assignment to the first borrower to a range of allocable resource values defined by a minimum number of resources assignable to the first borrower and a maximum number of resources assignable to the first borrower; or
      a second mapping of a range of priority values available for assignment to the first borrower to a plurality of priority levels associated with the first borrower;
   determining a hold priority of a second borrower based on a present resource allocation associated with the second borrower; and
   determining, using the first borrower request priority and the second borrower hold priority, whether to reallocate any of the second borrower resource allocation to the first borrower.

2. The method of claim 1, wherein the first mapping comprises a mapping of a single priority value in the range of priority values available for assignment to the first borrower to a sub-range of the allocable resource values of the range of allocable resource values.

3. The method of claim 2, wherein the single priority value in the range of priority values available for assignment to the first borrower is the highest priority value in the range of priority values available for assignment to the first borrower.

4. The method of claim 1, wherein the first mapping comprises an interpolation of a sub-range of the priority values in the range of priority values available for assignment to the first borrower to a sub-range of the allocated resource values in the range of allocable resource values.

5. The method of claim 1, wherein determining the first borrower request priority comprises:
   determining a number of resources presently assigned to the first borrower;
   selecting one of a plurality of priority thresholds for the first borrower based on a comparison of the number of resources presently assigned to the first borrower to a plurality of size thresholds; and
   determining the first borrower request priority based on the selected one of the priority thresholds for the first borrower.

6. The method of claim 5, wherein determining the first borrower request priority based on the selected one of the priority thresholds for the first borrower comprises:
   identifying, based on the selected one of the priority thresholds for the first borrower, a portion of the mapping to be used for determining the request priority of the first borrower; and
   determining the request priority of the first borrower from the identified portion of the mapping.

7. The method of claim 5, wherein the plurality of size thresholds comprises a minimum size threshold and a maximum size threshold, wherein the minimum size threshold is the minimum number of resources allocable to the first borrower and the maximum size threshold is the maximum number of resources allocable to the first borrower.

8. The method of claim 5, wherein the plurality of priority thresholds comprises a base priority threshold and a burst priority threshold, wherein the base priority threshold is equal to a minimum priority value in the range of priority values available for assignment to the first borrower and the burst priority threshold is equal to a maximum priority value in the range of priority values available for assignment to the first borrower.

9. The method of claim 1, wherein the priority levels are defined using a priority threshold, wherein the priority threshold comprises a priority value from the range of priority values.

10. The method of claim 1, wherein reallocation of resources of the second borrower to the first borrower is constrained by changes in the second borrower hold priority.

11. The method of claim 1, wherein reallocation of resources of the second borrower to the first borrower triggers at least one of a decrease in the first borrower request priority and an increase in the second borrower hold priority.

12. The method of claim 1, wherein the second borrower is one of a plurality of borrowers, wherein the second borrower is selected for the resource reallocation determination based on a respective plurality of hold priorities associated with the plurality of borrowers.

13. The method of claim 1, wherein determining whether to reallocate resources of the second borrower to the first borrower is further based at least in part on a length of time the resources have been allocated to the second borrower.

14. The method of claim 1, further comprising:
   in response to a determination to reallocate resources of the second borrower to the first borrower, initiating a message adapted for indicating to the second borrower the decision to reallocate a resource of the second borrower to the first borrower.

15. The method of claim 14, wherein the second borrower relinquishes control of the resources in a controlled manner following completion of at least a portion of the tasks for which the resource is being used by the second borrower.

16. The method of claim 1, wherein the resource request of the first borrower is associated with a resource pool and a resource reallocated from the second borrower to the first borrower is associated with the resource pool.

17. The method of claim 1, wherein the resource requested of the first borrower is associated with a first resource pool and a resource reallocated from the second borrower to the first borrower is associated with a second resource pool.

18. An apparatus for allocating a resource of a management system, comprising:
   a processor; and
   a memory storing instructions which, when executed by the processor, cause the processor to perform steps of:
      receiving, from a first borrower, a request for a system resource allocation;
      determining a request priority of the first borrower based on a present resource allocation associated with the first borrower, wherein the first borrower request priority is determined using at least one of:
         a first mapping of a range of priority values available for assignment to the first borrower to a range of allocable resource values defined by a minimum number of resources assignable to the first borrower and a maximum number of resources assignable to the first borrower; or a second mapping of a range of priority values available for assignment to the first borrower to a plurality of priority levels associated with the first borrower;

determining a hold priority of a second borrower based on a present resource allocation associated with the second borrower; and determining, using the first borrower request priority and the second borrower hold priority, whether to reallocate any of the second borrower resource allocation to the first borrower.

19. A non-transitory computer readable storage medium storing instructions which, when executed by a processor, cause the processor to perform a method for allocating a resource of a management system, the method comprising:

receiving, from a first borrower, a request for a system resource allocation;

determining a request priority of the first borrower based on a present resource allocation associated with the first borrower, wherein the first borrower request priority is determined using at least one of:

a first mapping of a range of priority values available for assignment to the first borrower to a range of allocable resource values defined by a minimum number of resources assignable to the first borrower and a maximum number of resources assignable to the first borrower; or a second mapping of a range of priority values available for assignment to the first borrower to a plurality of priority levels associated with the first borrower;

determining a hold priority of a second borrower based on a present resource allocation associated with the second borrower; and determining, using the first borrower request priority and the second borrower hold priority, whether to reallocate any of the second borrower resource allocation to the first borrower.

20. A method for allocating a resource of a management system, comprising:

receiving, from a first borrower, a request for a system resource allocation;

determining a request priority of the first borrower based on a present resource allocation associated with the first borrower;

determining a hold priority of a second borrower based on a present resource allocation associated with the second borrower;

determining, using the first borrower request priority and the second borrower hold priority, whether to reallocate any of the second borrower resource allocation to the first borrower; and reallocating a first resource from the second borrower to the first borrower, wherein reallocation of the first resource to the first borrower causes an increase in the second borrower hold priority prior to a determination as to whether a second resource of the second borrower is reallocated to the first borrower.

21. An apparatus for allocating a resource of a management system, comprising:

a processor; and a memory storing instructions which, when executed by the processor, cause the processor to perform steps of:

receiving, from a first borrower, a request for a system resource allocation;

determining a request priority of the first borrower based on a present resource allocation associated with the first borrower;

determining a hold priority of a second borrower based on a present resource allocation associated with the second borrower;

determining, using the first borrower request priority and the second borrower hold priority, whether to reallocate any of the second borrower resource allocation to the first borrower; and reallocating a first resource from the second borrower to the first borrower, wherein reallocation of the first resource to the first borrower causes an increase in the second borrower hold priority prior to a determination as to whether a second resource of the second borrower is reallocated to the first borrower.

22. A non-transitory computer readable storage medium storing instructions which, when executed by a processor, cause the processor to perform a method for allocating a resource of a management system, the method comprising:

receiving, from a first borrower, a request for a system resource allocation;

determining a request priority of the first borrower based on a present resource allocation associated with the first borrower;

determining a hold priority of a second borrower based on a present resource allocation associated with the second borrower;

determining, using the first borrower request priority and the second borrower hold priority, whether to reallocate any of the second borrower resource allocation to the first borrower; and reallocating a first resource from the second borrower to the first borrower, wherein reallocation of the first resource to the first borrower causes an increase in the second borrower hold priority prior to a determination as to whether a second resource of the second borrower is reallocated to the first borrower.

* * * * *